(12) United States Patent
Hago

(10) Patent No.: US 12,128,355 B2
(45) Date of Patent: Oct. 29, 2024

(54) CONVERSION OF FLUE GAS CARBON DIOXIDE TO VALUABLE CARBONS AND HYDROCARBONS

(71) Applicant: Wilson Hago, Camarillo, CA (US)

(72) Inventor: Wilson Hago, Camarillo, CA (US)

(73) Assignee: Hago Energetics Benefit Corporation, Camarillo, CA (US)

(*) Notice: Subject to any disclaimer, the term of this patent is extended or adjusted under 35 U.S.C. 154(b) by 0 days.

(21) Appl. No.: 16/775,281

(22) Filed: Jan. 29, 2020

(65) Prior Publication Data
US 2021/0008496 A1  Jan. 14, 2021

(51) Int. Cl.
| B01D 53/62 | (2006.01) |
| C01B 32/324 | (2017.01) |
| C09C 1/56 | (2006.01) |
| C10G 2/00 | (2006.01) |

(52) U.S. Cl.
CPC ............ B01D 53/62 (2013.01); C01B 32/324 (2017.08); C09C 1/56 (2013.01); C10G 2/32 (2013.01); B01D 2257/504 (2013.01); B01D 2259/806 (2013.01)

(58) Field of Classification Search
CPC ........................ B01D 53/1475; B01D 2257/80; B01D 53/62; B01D 2258/0283; B01D 2259/806; B01D 2257/504; C01B 32/324; C01B 3/02; C01B 3/22; C01B 3/32; C01B 3/34; C01P 2006/12; C10G 2/32; C09C 1/487; C09C 1/56; Y02P 20/151; Y02E 50/30
See application file for complete search history.

(56) References Cited

U.S. PATENT DOCUMENTS

| 5,427,762 A * | 6/1995 | Steinberg | ............ C07C 29/1518 423/449.1 |
| 5,767,165 A * | 6/1998 | Steinberg | .................. C01B 3/24 423/453 |
| 6,869,580 B2 * | 3/2005 | Wojtowicz | .............. B60L 58/34 423/437.2 |
| 8,372,311 B2 * | 2/2013 | Cheiky | .................... A61P 31/00 252/373 |
| 2008/0171246 A1 * | 7/2008 | Wojtowicz | ................ C01B 3/22 429/425 |
| 2010/0251615 A1 * | 10/2010 | Marker | .................... C10B 49/10 48/127.7 |
| 2010/0271505 A1 * | 10/2010 | Zimmer | ................. H04N 5/232 348/231.2 |
| 2018/0079979 A1 * | 3/2018 | Donegan | .................. C10J 3/721 |

FOREIGN PATENT DOCUMENTS

| EP | 1 436 367 A1 * | 7/2004 | ............... C01B 3/32 |
| GB | 858 032 A * | 1/1961 | ............... C01B 3/36 |
| WO | WO 2019 054 868 A1 * | 3/2019 | ............. C10B 49/04 |

* cited by examiner

Primary Examiner — Timothy C Vanoy
(74) Attorney, Agent, or Firm — Larry Williams

(57) ABSTRACT

The present invention relates to the conversion of flue gas to valuable products, in particular to the conversion of carbon dioxide in flue gas to liquid fuels and valuable carbons in a carbon negative manner.

19 Claims, 1 Drawing Sheet

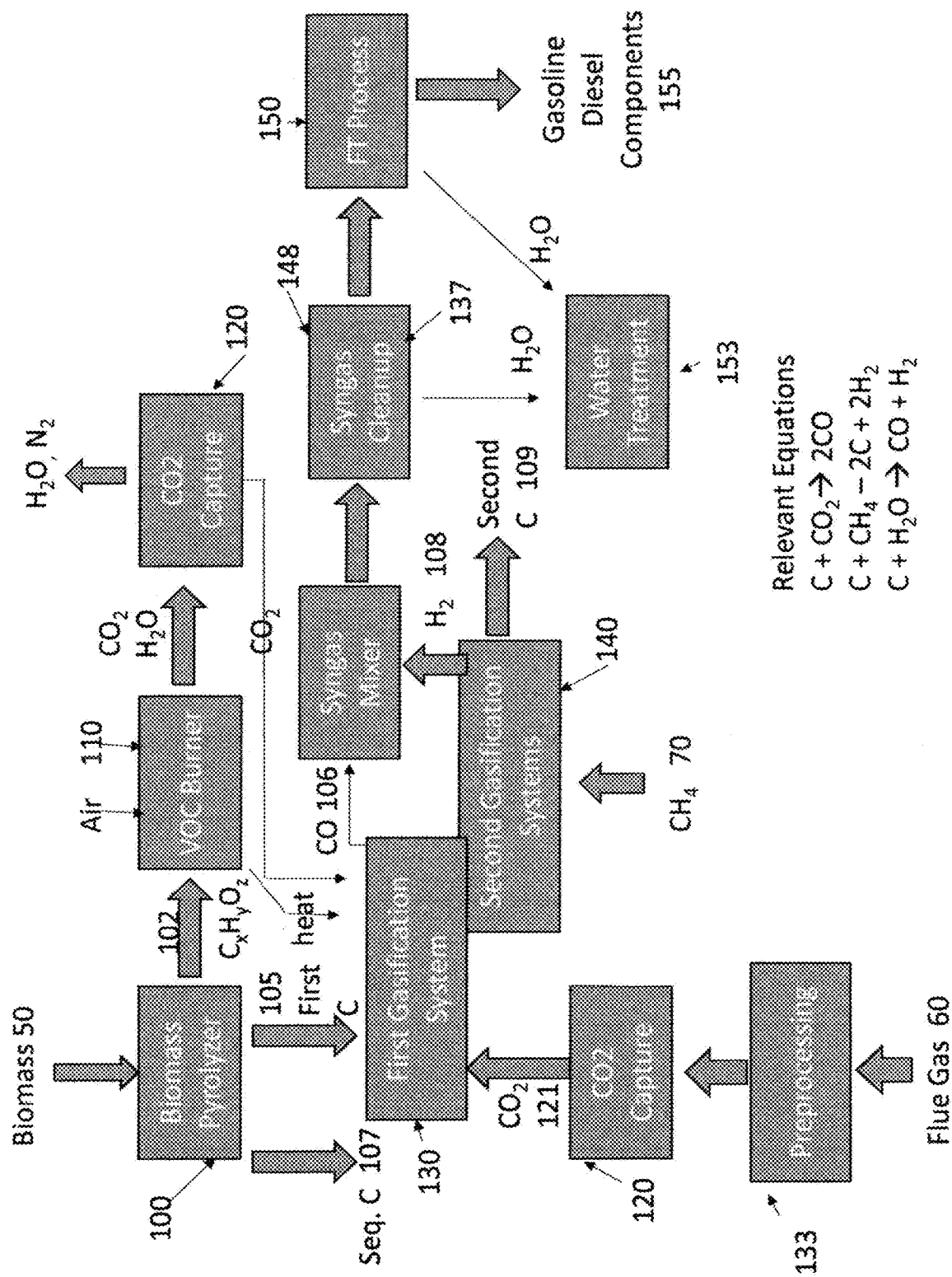

CONVERSION OF FLUE GAS CARBON DIOXIDE TO VALUABLE CARBONS AND HYDROCARBONS

RELATED APPLICATIONS

This application is a continuation-in-part of U.S. patent application Ser. No. 15/650,847 filed on Jul. 15, 2017, and claims benefit of provisional Ser. No. 62/849,937.

SUMMARY OF INVENTION

The present invention relates to the conversion of flue gas to valuable products, in particular to the conversion of carbon dioxide in flue gas to liquid fuels and valuable carbons in a carbon negative manner.

The basics of the process involves using biomass, flue gas and methane as inputs. The innovative aspects of the present invention relate to the production of liquid fuels using carbon dioxide, optionally using low temperature approaches. The details of the invention will become evident in a fuller description of the invention.

BACKGROUND OF INVENTION

Carbon dioxide continues to accumulate in the biosphere with the continued anthropogenic release of this substance, coming primarily from electricity production, transportation, agriculture and industrial production. It is important to find methods to capture this carbon dioxide before release and to find methods of effectively burying the carbon dioxide so that it is no longer a contributor as a greenhouse gas. We present such an approach in this invention, the novelty relying on the process of achieving this conversion in an integrated manner to significantly reverse global carbon dioxide buildup, levels if widely implemented.

Biomass is a readily available and abundant material found throughout the planet.

Biomass can be converted to a variety of products, either enzymatically or thermochemically. In a thermochemical conversion, biomass is the pyrolysis of biomass as shown in the following:

Biomass (cellulose, hemicelluloses, lignins)→Volatiles+C

The basic chemistry of $CO_2$ conversion is to use the above formed C in the Boudouard reaction.

$$C + CO_2 \rightarrow 2CO$$

Typically this reaction requires temperatures in excess 700° C., but we optionally use a non-thermal approach using much lower temperatures.

In addition to the above reaction, a similar non-thermal approach will be implemented can be implemented in the following gasification reaction:

$$C + CH_4 \rightarrow 2C + 2H_2$$

It is possible to obtain close to a 2:1 H.sub.2 to CO ratio by selective inflow of input streams.

The following gasification reaction are also options for the present innovative process:

$$C + H_2O \rightarrow CO + H_2$$

$$H_2O + CO \rightarrow CO_2 + H_2$$

Liquid fuel production is attained by conversion of generated synthesis gas to liquid fuel via a Fischer Tropsch (FT) process or methanol synthesis reaction as follows:

$$(2n+1)H_2 + nCO \rightarrow C_nH_{2n+2} + nH_2O$$

$$CO + 2H_2 \rightarrow CH_3OH$$

LIST OF FIGURES

FIG. 1 is a description of an embodiment of the process of the present invention

DETAILED DESCRIPTION OF INVENTION

The basic approach of our solution is to react flue gas carbon dioxide with a biocarbon at high temperatures or optionally at low temperatures using microwave technology to generate synthesis gas which will serve as the building block for valuable hydrocarbons.

The approach can be summarized by FIG. 1. It should be noted that FIG. 1 is simply an embodiment of the present invention with the intention of illustrating the present invention.

Biomass 50 is brought in from local sources, dried, and chipped to specification on site. Waste heat from the power plant can be used for the drying step. Biomass refers to any material of biological origin containing cellulose, hemicellulose or lignins as constituents. Preferable sources are pine beetle killed trees, a source which should be readily available due to drought issues and unusually high temperatures as the planet warms. This biomass is fed to biomass pyrolyzer 100 that will subject the biomass to an oxygen-free or nearly oxygen-free atmosphere and decompose the basic biomass constituents to volatile organic matter 102 and a first carbon 105, typically at temperatures between 300 and 650° C. This first carbon, alternately denoted as a biocarbon or biochar, is gasified in the presence of carbon dioxide 121 to yield product carbon monoxide 106 and a porous carbon (activated carbon) in a first gasification system 130. This activated carbon will generally have surface areas exceeding 300 $m^2/g$ and will be commercially useful as a water and/or air purification agent. This first gasification system, as well as the second one to be mentioned, can comprise any of well-known systems, such as counter-current fixed bed ("up draft") gasifier, co-current fixed bed ("down draft") gasifier, fluidized bed reactor, or entrained flow gasifier.

The gasification step may be performed at typical gasification temperatures exceeding 900° C, or it may be performed at significantly lower temperatures in the presence of microwave energy, as will be explained below. The biomass pyrolysis process can also deliver an excess of biocarbon, which can lead to the production of a sequesterable carbon 107, which can be used as a charcoal for agricultural purposes, also termed biochar. Volatile gases 102 may be directed to an air-blown burner which will completely oxidize the volatile materials and use the product heat to maintain or elevate the temperature of the charcoal to a sufficient temperature to facilitate the gasification reactions. The carbon dioxide from the combustion process will be recycled after output gas is passed through a water condenser and CO2 capture system 120, and subjected to the Boudouard reaction. Exhaust out of the burner will be primarily water and nitrogen.

Input carbon dioxide 121 can be derived from a carbon capture process 120 which concentrates the carbon dioxide concentration originally found in flue gas 60 after said flue gas undergoes a preprocessing step 133. The primary preprocessing step includes a water condensation step to remove most of the water in the flue gas. The carbon capture process 120 can also capture carbon dioxide resulting from the burned volatile gases 102 and direct them to first gasification system 130. Typical capture technologies include capture with carbonates such as potassium carbonate or capture with monothethanolamine (MEA)-based technology. Typical concentrations of carbon dioxide going into first gasification system surpass 80%.

Methane input 70 derived from either an independent supply or a diverted stream from a natural gas power plant is fed to a second gasification system 140 to produce a hydrogen product 108 and a second carbon product 109. This second carbon product is denoted carbon black and is a powder that accumulates on the surface of the unreacted biochar. As the methane decomposition proceeds the carbon black is removed from the reactor along with unreacted biochar, thereby ensuring a fresh exposed surface. This carbon black may be comprised of a mixture of carbons from biological or fossil sources. Hydrogen product 108 can be mixed in with carbon monoxide 106 in a single syngas mixer apparatus, or the products may be collected separately and fed to the syngas mixer apparatus. To achieve the Fischer Tropsch step or the methanol synthesis step, it is preferable to be able to control the ratio of hydrogen to carbon monoxide to established ratio, such as in the range between 1.5 and 2.5, and most preferentially between 2 and 2.2. The resulting syngas undergoes a syngas cleanup step 137 which includes a tar cleanup step 148 and resulting syngas is directed, after a water removal step, to a Fischer Tropsch process 150 or a methanol synthesis step (not shown) for the production of valuable hydrocarbons, such as diesel, gasoline, or waxes. In the case of a methanol synthesis step, the product will be methanol which can be easily converted to other more complex chemicals, such as dimethyl ether.

It should be noted that the carbon in the resulting combustible fuel will be approximately a mixture of biologically derived and fossil derived sources since the carbon monoxide in the syngas mixture is derived from gasification of a biologically derived carbon with carbon dioxide from fossil sources. As the present process sequesters carbon from fossil inputs flue gas and methane, it is expected to be a carbon negative process. If widely implemented, this process can play a role in red acing global levels of carbon dioxide in the world. The present approach incorporates the possibility of sequestering excess carbon as biochar, thereby significantly reducing the carbon footprint of the entire project, possibly rendering it with a carbon footprint or lifecycle analysis that is carbon negative. The produced activated carbon and carbon black can also be considered sequesterable carbons and may qualify for carbon credits.

The use of lower temperature gasification is an optional feature of the present invention that can make this process more economically viable. The charcoal once produced can be transferred to industrial microwave equipment while hot in an inert atmosphere where it will be subjected to microwave energy which can facilitate the Boudouard, steam gasification, and methane decomposition reactions at much lower temperatures than a thermal method. Methane, water or $CO_2$ gas can be introduced into a gasification system to execute their respective reactions at low temperature in a microwave cavity. Under standard conditions CO2 conversion in the Boudouard reaction is endothermic by 113 kJ/mole. The reaction becomes exothermic at 975K, but it has been shown by Hunt et al in J. Phys, Chem. C 2013, 117, 26871-26880 that the reaction thermodynamics changes substantially in the presence of microwave energy. It is believed that the reason for this dramatic effect on the thermodynamics of the reaction is believed to be the effect of microwaves on lowering the temperature at which the reaction turns exothermic. Microwaves excite electron-hole pairs in the carbon matrix which render the surface extremely active towards CO2 reactivity. It becomes easier to remove a carbonyl group from the carbon matrix, a step which is the rate determining step in this reaction. The thermodynamics using a microwave method also favor over 95% CO2 conversion at 650.degree. C. Microwaves frequencies used in the present invention vary from 915 MHz to 2450 MHz.

The overall process of the present invention is to convert the inputs of carbon in flue gas carbon dioxide, carbon in biomass, and carbon in natural gas to output carbons contained in biochar, activated carbon, carbon black, and to output carbons contained in combustible fuels. In this manner less valuable carbons are converted to more valuable carbons.

The invention claimed is:

1. A process to convert flue gas to combustible fuels, using biomass and natural gas as additional inputs, comprising: a) Pyrolyzing said biomass to produce biochar and volatile gases b) Gasifying a portion of said biochar in the presence carbon dioxide obtained from said flue gas to produce carbon monoxide and activated carbon in a first gasification system;
   c) Gasifying a portion of said biochar in the presence of natural gas to produce hydrogen and carbon black in a second gasification system and;
   d) Combining the generated carbon monoxide and hydrogen from the first and second gasification systems and inputting this combination in a hydrocarbon synthesis process to produce combustible fuels.

2. A process, according to claim 1, wherein the activated carbon has a surface area greater than 300 $m^2/g$.

3. A process according to claim 1, wherein some of the biochar is suitable for agricultural applications.

4. A process according to claim 1, wherein the carbon black is a powder that is removed with unreacted biochar.

5. A process according to claim 1, wherein activated carbon is produced with the aid of microwave energy.

6. A process according to claim1, wherein the carbon black is produced with the aid of microwave energy.

7. A process according to claim 1, wherein the volatile gases are burned to produce energy useful for the first and second gasification systems.

8. A process according to claim 1, wherein the synthesis gas ratio of carbon monoxide to hydrogen is adjustable.

9. A process according to claim 1, where in the synthesis gas ratio carbon monoxide to hydrogen varies from 1.5 to 2.5.

10. A process according to claim 1, wherein the carbon footprint is overall carbon negative.

11. A process according to claim 1, wherein flue gas carbon dioxide, carbon in biomass and carbon in natural gas are converted to biochar, activated carbon, carbon black and carbon in combustible fuels.

12. A process according to claim 1, wherein the hydrocarbon synthesis step is a Fischer Tropsch process.

13. A process according to claim 1, wherein the hydrocarbon synthesis step is a methanol synthesis process.

14. A process according to claim 5, in which the microwave energy uses frequencies in the range of 915 to 2450 MHz.

15. A process according to claim 6, in which the microwave energy uses frequencies in the range of 915 to 2450 MHz.

16. A process according to claim 1, wherein the carbon black may be comprised of carbon from fossil or biological sources.

17. A process according to claim 1, wherein the activated carbon may be comprised of carbon from fossil or biological sources.

18. A process according to claim 1, wherein the carbon content of the combustible fuel is approximately equally divided between fossil and biological carbons.

19. A process according to claim 7, wherein the carbon dioxide resulting from burning the volatile gases are fed back into the input flue gas.

* * * * *